Sept. 8, 1970                    A. CILIONE                    3,526,955
                    METHOD OF ATTACHING FASTENER COMPONENTS
                            Filed March 26, 1968
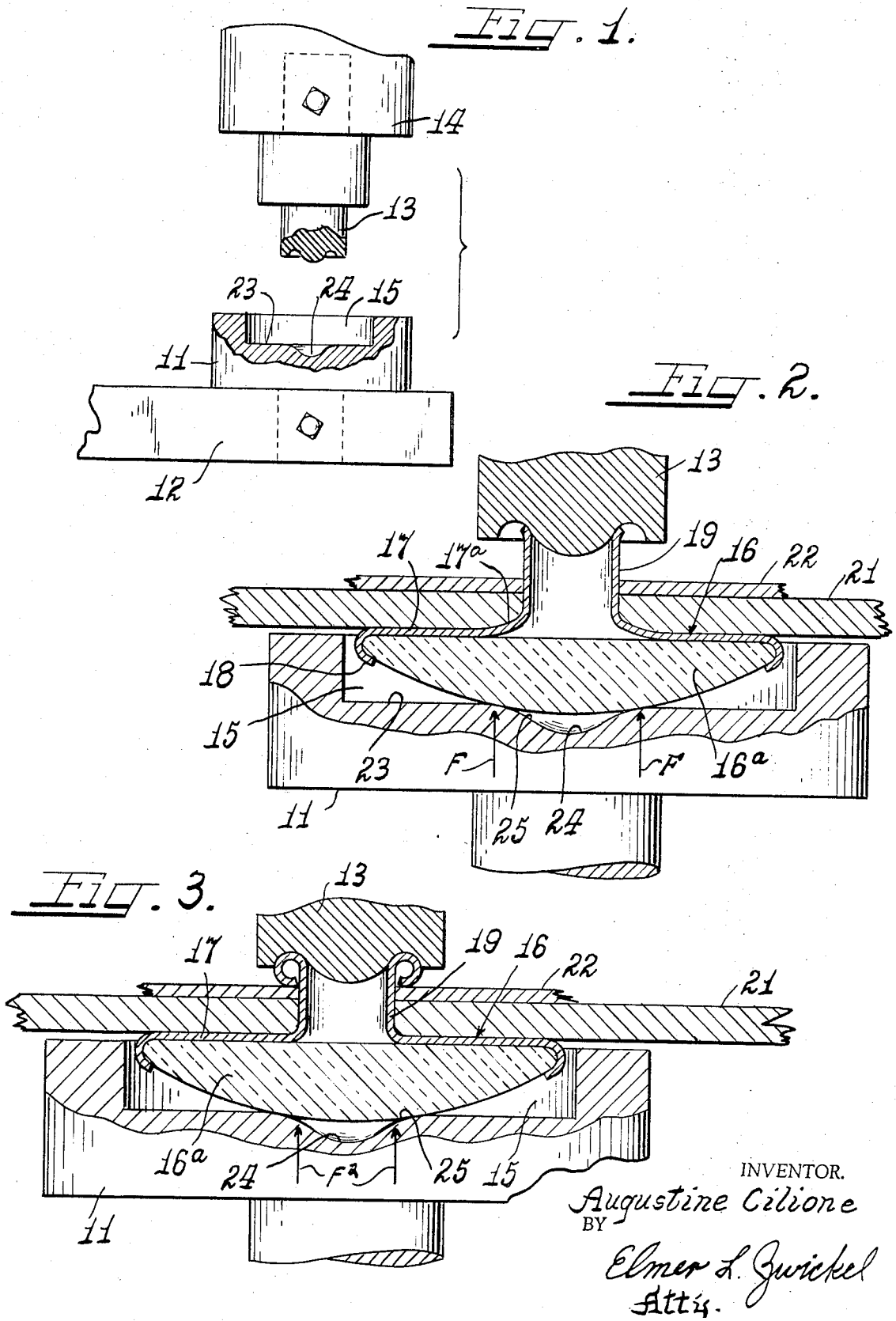

United States Patent Office 3,526,955
Patented Sept. 8, 1970

3,526,955
METHOD OF ATTACHING FASTENER COMPONENTS
Augustine Cilione, Cranston, R.I., assignor to U.S. Industries, Inc. (doing business as Rau Fastener), Providence, R.I., a corporation of Delaware
Filed Mar. 26, 1968, Ser. No. 716,162
Int. Cl. B21d 39/00; B23p 11/00
U.S. Cl. 29—512    8 Claims

ABSTRACT OF THE DISCLOSURE

The method of attaching fastener components having fragile inserts which involves the use of a bottom tool having its insert supporting face contoured in a manner to impart controlled forces in a vertical direction and only in an area that is backed by the eyelet barrel so as to resist fracture of the fragile insert.

---

The invention relates to the method of attaching a fastener component having a fragile insert to a support sheet. Fastener components of the type including an eyelet barrel and having fragile insert, such as glass, polyester or the like, have been substantially impossible of machine attachment because the use of known attaching tools has resulted in fracturing the insert. Fastener components are customarily applied to a support sheet by automatic machines including a bottom tool upon which the component is seated. Such known tools tend to apply a crushing force in uncontrollable directions over substantially the entire area of the insert while the upper tool applies force in the area of the eyelet barrel for upsetting the same. This uneven unpredictable application of opposing forces in several directions causes the fragile insert to shatter or otherwise become ruptured or "crazed" so as to render it unsuited for use. Various forms of cushioning have been incorporated between a fragile insert and its mounting with some degree of success. However, these additional cushioning elements create time consuming and expensive problems of assembly and increase the overall thickness of the fastener component. Because of this problem it has been customary to provide non-fragile inserts such as acetate or nylon. Use of these materials is undesirable because they lose their luster and often become deformed as during dry cleaning processes.

The present invention has for an object the use of fastener components having a fragile insert and the attachment of such components by means of a novel tool which generates fields of force opposed to and in direct line with the forces applied to the component eyelet barrel during attachment.

It is another object of the invention to provide a novel method for attaching fragile fastener components to a support sheet.

The method by means of which the above noted and other advantages and objects of the invention are attained will be described in the following specification, taken in conjunction with the accompanying drawings, showing a preferred illustrative embodiment of the invention, in which:

FIG. 1 is a fragmentary elevational view of an attaching machine head including attaching tools, both of which are shown in partial section.

FIG. 2 is an enlarged view of the attaching tools showing a fastener component therein, and illustrating their relationship at the start of a pressure stroke.

FIG. 3 is a view similar to FIG. 2, showing the parts in their relationship at the completion of the pressure stroke.

Referring to the exemplary form of the disclosure of the invention as shown in the accompanying drawings, the lower or bottom tool 11 is supported in a rigid base 12 of an attaching machine, whereas the other or top tool 13 is carried on the bottom end of a ram 14. In use, a fastener component is seated on the bottom tool and a support sheet and other component is laid thereover whereupon the upper tool 13 is carried downwardly to secure the parts together. This is best illustrated in FIGS. 2 and 3 which will now be referred to in detail.

The bottom tool 11 is formed on its upper face with a recess 15 of requisite size and shape to receive loosely therein the fastener component 16 seated therein. As previously stated the fastener component includes a fragile insert 16a having a domed surface that is held assembled wtih a base flange 17 by means of a perimeter flange 18. The base flange 17 includes an integral axial eyelet barrel 19 that is extended up through an aperture in a support sheet 21 and a second component 22, such as a stud or socket, is fitted onto the projecting end of the eyelet barrel. As shown, the area of the base flange immediately surrounding the eyelet barrel 19 curves upwardly gradually, as at 17a, to merge with said eyelet barrel and constitute a flared base therefor.

The recess 15 in the bottom tool 11 has a bottom wall 23 formed with an axial cavity 24, the side walls of which merge gracefully with the bottom wall 23 as by the curved surface shown at 25. The outer diameter of the curved surface 25 is in substantial vertical alignment with the largest diameter of the flange curvature 17a, whereas its innermost diameter is in substantial alignment with the wall of the eyelet barrel 19. It should be noted that the curved bottom surface of the fragile insert 16a seats on the curved surface 25 and has no other contact with the recess bottom wall 23.

With this assemblage of parts in position, the attaching machine is operated to carry the upper tool 13 downwardly against the upper end of the eyelet barrel 19 so as to roll or clench it tightly over the second fastener component 22. Initially, the upper tool 13 will contact the eyelet barrel substantially in the manner illustrated in FIG. 2. When this initial contact is effected, pressure on the underlying fragile insert is in a vertical direction on the area of the larger diameter (.200 in.) of the curvature 25, as indicated in FIG. 2 by line "F." As pressure continues the curved area 17a of the eyelet barrel 19 flattens, thus carrying the circular pressure line inwardly radially which is opposed at all times to the underlying curved surface 25. By the time final clenching is effected, as shown in FIG. 3, the vertical line of pressure is as indicated at "F²," that is: it is on a circle of approximately .075 in. diameter, and in vertical alignment with the wall of the eyelet barrel 19. It will thus be seen that pressure is applied on the fragile insert in a vertical direction only at all times and that the peripheral areas of the fragile insert are never subjected to pressure. Because of this control of vertical applied pressure there is never any lateral or diagonal stress placed on the fragile insert and it is thus not subjected to breakage, fracture or "crazing."

Although a preferred embodiment of the invention has been described, it will be understood that the description thereof is intended to be illustrative, rather than restrictive, as details of the steps of the method may be modified or changed without departing from the spirit or scope of the invention. Accordingly, it is not desired to be restricted to the exact disclosure described.

I claim:

1. The method of mounting a fastener component of a type having an eyelet barrel projecting from one face and a fragile insert on its other face comprising the steps of: extending said eyelet through a support sheet and through a second component seated on said support sheet, positioning the first named component in a recess in an attaching tool with its fragile insert seated on the bottom wall thereof, applying pressure downwardly on said eyelet barrel end to clench same over the second component while supporting said fragile insert in said recessed bottom wall in such manner that applied pressure on the insert is localized in an area underlying the eyelet barrel.

2. The method recited in claim 1, and the additional step of forming a central cavity in the bottom wall of said recess.

3. The method recited in claim 2, and the additional step of maintaining the bottom wall area outwardly of the cavity spaced from the fragile insert.

4. The method of mounting a fastener component of a type having an eyelet barrel projecting from one face and a fragile insert on its other face, comprising the steps of applying endwise pressure on the eyelet barrel end to clench same over a support sheet through which it is extended while supporting the fragile insert with a back-up means engageable with the insert in an area underlying the area of the eyelet barrel only.

5. The method recited in claim 4 and the additional step of seating the fastener component in a recess formed in the back-up means.

6. The method recited in claim 5, and the additional step of forming a central cavity in the recess.

7. The method recited in claim 5, and the additional steps of forming a central cavity in the recess and flaring the side wall of said cavity outwardly to merge with the bottom wall of the recess.

8. The method recited in claim 5, and the additional steps of forming a central cavity in the recess, flaring the side wall of said cavity outwardly upwardly to merge with the bottom wall of the recess, and maintaining contact between the flared sidewall of the cavity and the fragile insert only.

References Cited

UNITED STATES PATENTS

| | | |
|---|---|---|
| 295,593 | 3/1884 | Thayer. |
| 310,953 | 1/1885 | Mersereau _____ 63—26 XR |
| 1,804,284 | 5/1931 | Smith. |
| 2,033,692 | 3/1936 | Dover _____ 29—512 XR |
| 2,278,025 | 3/1942 | Sadoski. |
| 2,533,870 | 12/1950 | Bayer. |

CHARLIE T. MOON, Primary Examiner

U. S. Cl. X.R.

29—523, 160.6 243.52; 24—94; 63—26